3,010,875
LYOPHILIZED SYPHILIS COMPLEMENT FIXATION ANTIGEN AND ITS PREPARATION

Leona R. Cappel and Norman O. Cappel, West Chester, Pa., assignors to Becton, Dickinson and Company, Rutherford, N.J., a corporation of New Jersey
No Drawing. Filed Mar. 18, 1958, Ser. No. 722,130
4 Claims. (Cl. 167—84.5)

This invention relates to an improved antigenic preparation and to an improved method of preparing the same.

Certain antigens useful in immunology tests are relatively unstable and readily lose their antigenic properties. Thus, the antigens formed from and containing extracts of micro-organisms of the order Spirochaetales present problems in handling, shipping, and storing and, generally speaking, rapidly lose their antigenic properties unless preserved in frozen condition. Specific examples are the antigens prepared from the spirochete, *Treponema pallidum*, used in tests for syphilis, such as the Treponema pallidium complement fixation antigen, referred to as TPCF prepared from the Nichols strain of *Treponema pallidum* and also the Reiter protein complement fixation antigen prepared from the Reiter strain of *Treponema pallidum*. The TPCF antigen and test are known among immunologists and are specifically described in an article entitled "Treponema pallidum Complement Fixation (TPCF) Test for Syphilis," published in The American Journal of Clinical Pathology, vol. 26, No. 3, March 1956. The Reiter protein complement fixation antigen is also known among immunologists and is described in an article entitled, "Reiter Complement Fixation Test for Syphilis," appearing in Public Health Reports, vol. 72, No. 4, April 1957. Both of these tests are well regarded since they eliminate the false positive readings characteristic of other tests for syphilis, such as the Kolmer-Wasserman reaction. However, antigens of this type are relatively unstable and it has been necessary to ship and store them in the frozen fluid state. Prior attempts to desiccate or lyophilize antigens of this type have been unsuccessful and have resulted in impairment or destruction of the antigenic properties.

It is an object of the present invention to overcome the prior difficulties and disadvantages and to provide an improved antigenic preparation made from and containing extracts from micro-organisms, particularly micro-organisms of the order Spirochaetales which are relatively stable, which are in the lyophilized or dessicated state and can be stored and shipped in unfrozen condition and which may be readily restored to the fluid state and used in complement-fixation tests.

Our invention is particularly applicable but not limited to antigens comprising active principles extracted from micro-organisms of the order Spirochaetales such as the *Treponema pallidum*. The preparation of the liquid antigen by dissolving the active principle of the antigen from the micro-organisms does not constitute our present invention and the antigen solution may be prepared in the usual manner, as for instance in the manner described in the two articles referred to above. Our invention is primarily concerned with an improved treatment for preserving antigens so that they may be stored and shiped in unfrozen condition without substantial loss of antigenic properties.

In carrying out our invention, we use the antigen in its fluid state (i.e. in solution) and prepared in the usual manner and we mix with it a predetermined proportion of albumin which is serologically inactive and will not adversely affect the antigen, the complement and indicator which is used or the antibody present in the blood being tested. Thereafter, the fluid antigen with the albumin mixed therewith is desiccated by standard lyophilization procedures and the lyophilized or desiccated antigen preparation can be stored for indefinite periods preferably, but not necessarily, under refrigeration without loss of its antigenic properties.

As indicated above, the albumin used in our invention should not adversely affect the antigen, the complement or indicator used in the test or the antibody present in the blood being tested. For this purpose, we have found that albumin prepared from bovine, sheep, horse or fowl serum or inactivated syphilis-negative human serum, and also the albumin from chicken eggs serve very satisfactorily. The quantity of albumin employed in the solution in its final form just prior to lyophilization is important. In the case of the antigens prepared from the spirochetes, particularly the TPCF antigen and the Reiter protein complement fixation antigen, we have found that at least one gram of albumin should be included in each 100 ml. of solution of antigen and albumin. The proportion of albumin may be increased considerably above this amount; however, as a practical matter we have found that a solution containing more than 30 grams per 100 ml. of solution becomes excessively viscous and difficult to handle. We have found that very satisfactory results are obtained where between 6 and 12 grams of albumin are included in each 100 ml. of solution.

In preparing our antigenic preparation, the stock antigen is mixed with the albumin which may be either in dry form or in solution. The stock antigen as initially prepared by extraction from the micro-organisms is frequently in considerably more concentrated form than the standard antigen to be used in the complement-fixation test and may have a titer as high as 1:50, 1:100 or more. In the case of the antigens prepared from *Treponema pallidum*, the standard antigen which is commonly used is the standard for one-fifth volume Kolmer-Wasserman technique and has one unit of antigen per 0.1 ml. of solution. In this patent application the expression "standard antigen" when applied to antigens prepared from *Treponema pallidum* shall mean the standard for one-fifth volume Kolmer-Wasserman technique as herein indicated having one unit of antigen per 0.1 ml. of solution. Under this technique only 0.1 ml. of antigen solution is used for each test. The expression "unit of antigen" is well known to serologists and immunologists. In the case of antigens prepared from *Treponema pallidum*, including both the TPCF antigen and the Reiter protein complement fixation antigen, one unit of antigen is that amount of antigen which when combined with a positive serum will fix two units of complement. The titer of the solution indicates the ratio of concentration or dilution of the stock solution as compared with the standard. Thus where the stock antigen solution has a titer of 1:10, its volume must be diluted to ten times its original volume in order to equal the standard. In other words, 1 ml. of stock antigen having a titer of 1:10 should be diluted with 9 ml. of distilled water to produce 10 ml. of standard antigen.

In preparing the solution to be lyophilized, the albumin should be added in the proportions indicated above, namely at least 1 gram of albumin should be included in each 100 ml. of solution of antigen and albumin in its final form prior to lyophilization.

One convenient method of mixing the antigen with the albumin is to provide an albumin solution, as for instance a 30 percent solution in weight-volume relationship (i.e., 30 grams of albumin in 100 ml. of solution). By using a 30 percent weight-volume solution, the stock antigen solution can be diluted and the albumin mixed therewith at the same time. However, if desired, the albumin may be added to the stock solution in dried form and the stock solution may be diluted with distilled water. Dried albumin preparations generally contain various inert materials and it should be borne in mind that the antigen mixture should contain at least 1 gram of albumin (excluding impurities and inert materials) for each 100 ml. of antigen and albumin solution.

After the antigen and albumin solution has been prepared in the indicated proportions, it is placed in sterile containers, such as vials or ampoules, in the proper quantity for conducting one complement-fixation test or for conducting a specified number of tests. As an example, 0.1 ml. of standard antigen (one-fifth volume Kolmer-Wasserman technique) is required for conducting one complement-fixation test and this quantity of solution of standard antigen and albumin is placed in the sterile vial or ampoule where it is desired to package in one-test quantities. If the solution of antigen and albumin is more concentrated than standard antigen solution, then the equivalent quantity (i.e., the quantity having 1 unit of antigen) is placed in the sterile vial or ampoule. Similarly where it is desired to package in ten-tests quantities, 1 ml. of solution of standard antigen and albumin (or the equivalent of a more concentrated solution) should be placed in the sterile vial or ampoule.

Thereafter the solutions in the vials or ampoules are desiccated by standard lyophilization procedures as by freezing under vacuum until only a desiccated mixture of antigen and albumin remains in the ampoules or vials. The ampoules or vials are then sealed. The packaged product may be stored indefinitely, preferably although not necessarily under refrigeration, without loss of antigenic properties.

When it is desired to conduct a complement-fixation test, the lyophilized antigen preparation is restored by adding sufficient physiological saline to provide a solution of standard antigen (one-fifth volume Kolmer-Wasserman technique).

In the case of single-test quantities the antigen is restored to standard strength by adding sufficient physiological saline to provide 0.1 ml. of solution. In the case of multi-test units, the desiccated preparation may be restored to standard strength at once by adding the full quantity of physiological saline to provide the required quantity of solution or it may be only partially restored by adding only a fraction of the quantity of physiological saline required. In the latter case unit quantities are then fully restored to standard strength by adding additional physiological saline as each test is conducted. As an example, in the case of a ten-test vial or ampoule, sufficient physiological saline may be initially added to provide 0.5 ml. of solution. To conduct one complement-fixation test a quantity of 0.05 ml. is withdrawn and 0.05 ml. of physiological saline is added thereto providing 0.1 ml. of standard solution. The remaining antigen solution may be stored until it is used at which time it is fully restored to standard by the addition of physiological saline.

The complement-fixation tests are conducted upon human serum with the restored solution of standard antigen and albumin in the usual manner with a suitable complement, such as guinea pig serum, and a suitable indicator, such as washed, pooled sheep cells and anti-sheep hemolysin.

Specific examples of the preparation of antigen in accordance with our invention are as follows:

*Example I*

Treponema pallidum complement-fixation antigen with a titer of 1:15 is prepared in the usual manner as described in the article appearing in The American Journal of Clinical Pathology, referred to above. 3 ml. of 30 percent bovine-albumin solution (i.e. having 30 grams of albumin in 100 ml. of solution) are added to 11 ml. of distilled water, and this solution is then mixed with 1 ml. of the stock antigen, producing a solution of standard antigen and albumin. This solution is then placed in sterile vials or ampoules in quantities sufficient to conduct one test (i.e., 0.1 ml.) or in quantities sufficient to conduct a plurality of tests. The solution in the vials or ampoules is then desiccated by standard lyophilization procedures and the vials or ampoules are then sealed. The resultant lyophilized antigenic preparation may be stored for long periods of time, preferably but not necessarily under refrigeration. The preparation may be restored for use by adding sufficient physiological saline to provide a solution of standard antigen and albumin. In the case of individual-test ampoules, sufficient physiological saline should be added to provide 0.1 ml. of solution and comparable quantities should be added to the multi-test vials or ampoules. As previously indicated, the multi-test vials or ampoules may be only partially restored to standard strength and the individual-test quantities can then be fully restored as needed. The complement-fixation tests are conducted upon human serum in the usual manner.

*Example II*

Treponema pallidum complement-fixation antigen having a titer of 1:5 is prepared in the usual manner as described in the article appearing in The American Journal of Clinical Pathology, referred to above. 1 ml. of 30 percent bovine albumin solution (i.e. containing 30 grams of albumin to 100 ml. of solution) is added to 3 ml. of distilled water and the albumin solution is then mixed with 1 ml. of the stock antigen so as to provide a solution of standard antigen and albumin. The solution is then placed in sterile vials or ampoules in quantities sufficient to conduct one test or a plurality of tests. The preparation in the vials or ampoules is then desiccated by standard lyophilization procedures and thereafter the vials or ampoules are sealed. The resultant lyophilized antigenic preparation may be stored for long periods of time, preferably but not necessarily under refrigeration, without loss of antigenic properties. The preparation may be restored and used in the same manner as indicated under Example I.

*Example III*

Treponema pallidum complement-fixation antigen having a titer of 1:10 as prepared in the usual manner as described in the article appearing in The American Journal of Clinical Pathology, referred to above. 1 ml. of 30 percent bovine albumin solution (i.e. having 30 grams of albumin per 100 ml. of solution) is mixed with 1 ml. of the stock antigen, producing a solution of antigen and albumin having a titer of 1:5. This solution is then placed in sterile vials or ampoules in quantities sufficient to conduct one test or in quantities sufficient to conduct a plurality of tests. Since the antigen has a titer of 1:5, 0.02 ml. will be sufficient to conduct one test, and 0.2 ml. will be sufficient to conduct ten tests. The solution in the vials or ampoules is then desiccated by standard lyophilization procedures and the vials or ampoules are then sealed. The resultant lyophilized antigenic preparation may be stored for long periods of time, preferably but not necessarily under refrigeration. The preparation may be restored for use by adding sufficient physiological saline to provide a solution of standard antigen and albumin. In the case of individual-test ampoules in which 0.02 ml. of the solution had been placed prior to lyophilization, sufficient physiological saline should be added to provide 0.1 ml. of solution and corresponding quantities should be added to the multi-test vials or ampoules. It will be appreciated that the multi-test vials or ampoules may be only partially restored initially and can then be fully restored at a later date when needed. The complement-fixation tests are conducted upon human serum in the usual manner.

*Example IV*

Reiter protein complement-fixation antigen having a titer of 1:64 is prepared from the Reiter strain of Treponema pallidum in the manner described in the article entitled, "Reiter Protein Complement Fixation Test for Syphilis," appearing in The Public Health Reports, pages 335 to 340, vol. 72, No. 4, April 1957. For convenience the stock solution may be diluted to 8 times its volume with distilled water to produce an antigen solution having a titer of 1:8. Thereafter 1.6 ml. of 30 percent bovine albumin solution (i.e. having 30 grams of albumin and 100 ml. of solution) is added to 5.4 ml. of distilled water and the resultant solution is mixed with 1 ml. of the antigen having a titer of 1:8, thereby producing 8 ml. of standard antigen solution. This solution is then placed in sterile vials or ampoules in quantities sufficient to conduct one test (i.e., 0.1 ml.) or in quantities sufficient to conduct a plurality of tests. Then the solution in the vials or ampoules is desiccated as previously indicated by standard lyophilization procedures and the vials or ampoules are then sealed. The resultant lyophilized antigenic preparation may be stored for long periods of time, preferably but not necessarily under refrigeration. The desiccated preparation may be restored and used as previously indicated.

*Example V*

Where the titer of the antigen is not known, it may be desiccated in two separate stages and the titer is determined prior to the second stage. As an example, 1 ml. of stock Reiter protein complement-fixation antigen of unknown titer is mixed with 1 ml. of 30 percent bovine albumin solution (i.e. having 30 grams of albumin in 100 ml. of solution) and is placed in a serum bottle and dried. In the meantime, the titer of the antigen is determined from another sample of the same stock and is found to be 1:50. The dried antigen in the serum bottle then has added thereto 13.5 ml. of distilled water and 11.5 ml. of 30 percent bovine albumin solution, producing an antigen solution having a titer of 1:2. This solution is then placed in sterile vials or ampoules in quantities sufficient to conduct one test or in quantities sufficient to conduct a plurality of tests. Since the titer is 1:2, a quantity of 0.05 ml. is sufficient for conducting one test. The solution in the vials or ampoules is then desiccated by standard lyophilization procedures and the vials or ampoules are then sealed. The resultant lyophilized antigenic preparation may be stored for long periods of time, preferably but not necessarily under refrigeration. The preparation may be restored and used in the manner indicated above.

It will thus be seen that we have provided an improved antigenic preparation and method of preparing the same which are in the lyophilized or desiccated state and can be stored and shipped in unfrozen condition and which may be readily restored to the fluid state and used in complement-fixation tests.

We claim:

1. The method of preparing a desiccated antigenic preparation capable of being restored by the addition of a solvent for use in complement-fixation tests for syphilis which comprises providing an antigen solution which includes a serologically active *Treponema pallidum* complement-fixation antigen, mixing with the antigen solution an albumin which is serologically inactive and will not adversely affect the antigen or the complement or indicator to be used in the test in the proportion of at least approximately 1 gram of albumin to 100 ml. of solution of antigen and albumin, then desiccating the mixture by lyophilization procedures and finally sealing the mixture in sterile containers.

2. A desiccated antigenic preparation which can be restored by the addition of a solvent for use in complement-fixation tests for syphilis which comprises a serologically active *Treponema pallidum* complement-fixation antigen, having intimately mixed therewith an albumin which is serologically inactive and will not adversely affect the antigen or the complement or indicator to be used in the test, said mixture being prepared by mixing the albumin with a solution of the antigen in the proportion of at least approximately 1 gram of albumin in each 100 ml. of solution of antigen and albumin, said mixture being in sterile lyophilized form.

3. The method of preparing a desiccated antigenic preparation capable of being restored by the addition of a solvent for use in complement-fixation tests for syphilis which comprises providing an antigen solution which includes a serologically active *Treponema pallidum* complement-fixation antigen, mixing with the antigen solution an albumin which is serologically inactive and will not adversely affect the antigen or the complement or indicator to be used in the test in the proportion of between approximately 6 and 12 grams of albumin to 100 ml. of solution of antigen and albumin, then desiccating the mixture by lyophilization procedures and finally sealing the mixture in sterile containers.

4. A desiccated antigenic preparation which can be restored by the addition of a solvent for use in complement-fixation tests for syphilis which comprises a serologically active *Treponema pallidum* complement-fixation antigen having intimately mixed therewith an albumin which is serologically inactive and will not adversely affect the antigen or the complement or indicator to be used in the test, said mixture being prepared by mixing the albumin with a solution of the antigen in the proportion of between approximately 6 and 12 grams of albumin in each 100 ml. of solution of antigen and albumin, said mixture being in sterile lyophilized form.

References Cited in the file of this patent

UNITED STATES PATENTS 2,892,755    Portnoy _____ June 30, 1959

OTHER REFERENCES

Flosdorf: J. Immunology, vol. 50, 1945, pp. 38–52.

Public Health Reports, vol. 55, No. 13, March 29, 1940, p. 546.

Swift: J. of Bacteriology, April 1937, pp. 411–421.

Freezing and Drying, The Institute of Biology, Tavistock Sq., London, June 1951, pp. 113, 114, 115.

Portnoy: A. J. of Clin. Path. 26: 3, March 1956, pp. 313–322.